United States Patent [19]

Allison

[11] Patent Number: 5,209,386
[45] Date of Patent: May 11, 1993

[54] FILING AND ORGANIZING DEVICE FOR MOTOR VEHICLES

[76] Inventor: John C. Allison, 16718 Firth La., Houston, Tex. 77084

[21] Appl. No.: 797,186

[22] Filed: Nov. 25, 1991

[51] Int. Cl.⁵ .............................................. B60R 7/00
[52] U.S. Cl. .................................... 224/275; 224/277; 296/37.15; 220/529
[58] Field of Search ......... 224/273, 275, 277, 42.46 B; 206/45, 525, 561; 229/117.01, 117.05, 117.06, 120.33; 383/2; 220/529, 535; 108/44; 248/311.2; 297/191; 296/37.1, 37.5, 37.8, 37.15

[56] References Cited

U.S. PATENT DOCUMENTS

| | | | |
|---|---|---|---|
| 1,527,056 | 2/1925 | Martin | 224/42.46 B |
| 2,135,533 | 11/1938 | Ringler | 206/45 |
| 2,305,299 | 12/1942 | Lombardini | 220/529 |
| 2,979,098 | 4/1961 | Greaves | 150/1 |
| 3,014,759 | 12/1961 | Bing | 297/191 |
| 3,756,481 | 9/1973 | Schaefer | 224/42.42 A |
| 3,873,010 | 3/1975 | Patterson | 224/42.42 A |
| 3,986,649 | 10/1976 | Heimstra | 224/42.46 B |
| 4,267,868 | 5/1981 | Lowe | 383/2 |
| 4,274,567 | 6/1981 | Sawyer | 224/277 X |
| 4,702,402 | 10/1987 | Ferri | 224/273 X |
| 4,832,241 | 5/1989 | Radcliffe | 224/275 |
| 4,928,865 | 5/1990 | Lorence et al. | 224/275 |
| 4,949,890 | 8/1990 | Schultz | 224/275 |
| 4,953,673 | 9/1990 | Ambasz | 383/2 X |
| 4,966,318 | 10/1990 | Dutka | 224/42.46 R |
| 5,002,215 | 3/1991 | Gregoire | 224/277 |

FOREIGN PATENT DOCUMENTS 248813 3/1948 Switzerland .................. 220/529
2124189 2/1984 United Kingdom ............ 224/175

OTHER PUBLICATIONS

Coupon, Hannah Hansen, Washington Post. Mar. 4, 1990.

Primary Examiner—Henry J. Recla
Assistant Examiner—Glenn T. Barnett
Attorney, Agent, or Firm—Harrison & Egbert

[57] ABSTRACT

A filing and organizing device for vehicle seats having a front panel, a rear panel, and first and second flexible side walls extending from the front panel to the rear panel. A flexible bottom extends across an area formed by the panels and the side walls so as to define a central receiving area. A plurality of divider panels are removably affixed to the side walls and positioned in generally parallel relationship to the panels. An attachment belt is connected to the rear panel for removably attaching the device to a car seat. Each of the panels and the dividers have different sizes. The dividers are supported on tracks positioned along the inner surface of the side walls. A strap is provided so as to extend from the rear panel across the front surface of the front panel for affixing the position of the front panel with respect to the rear panel.

16 Claims, 3 Drawing Sheets

FILING AND ORGANIZING DEVICE FOR MOTOR VEHICLES

TECHNICAL FIELD

The present invention relates to filing devices in general. More particularly, the present invention relates to filing devices which are adapted for use within an interior of a motor vehicle. Specifically, the present invention relates to filing and organizing devices for motor vehicles which are adjustably and securely located on the passenger seat.

BACKGROUND ART

With the ever-increasing use of motor vehicles in the transaction of business, business people frequently find themselves in situations where business is conducted from their vehicle. This situation is being rapidly magnified by a plethora of new electronic business products that are intended for vehicular use. Most notable among these is the cellular telephone. Indeed, it has been common practice among business people at all levels to avail themselves of business-related activities during commuting.

Those persons that practice heir business from the automobile have long had the problem of storing and easily retrieving office implements such as ordering books, displays, advertising literature, forms and other stationery supplies that are used on a daily basis. This problem is further compounded by sales persons that must service a large number of accounts.

With the proliferation of vehicle-related business activity, it has become increasingly necessary to have readily available those documents and other items which must be consulted in the course of vehicular transacted business. Clearly, relying upon one's briefcase is not the solution because the demands of driving are incompatible with opening and searching through a briefcase for a document. Simply relying upon documents sitting upon the passenger seat is also not a solution, as the inertial forces encountered during driving will soon turn even the most carefully organized collection into a mess encompassing every corner of the passenger space of the vehicle. The most common method used by sales and business persons to store and retrieve supplies is to keep them in their briefcase or to maintain a "pentaflex" type file system in the trunk or on the floor of the vehicle.

In the past, there have been several attempts in the prior art to provide a vehicular filing system. For example, U.S. Pat. No. 2,979,098, issued on Apr. 11, 1961, to R. K. Greaves shows a saddle bag for automobiles in which a first bag is draped over one side of the seat and a second bag is draped over another side of the seat. The bag has several compartments which allow for the storage of various items. A central storage area is provided for the accumulation of larger paper items. U.S. Pat. No. 3,014,759, issued on Dec. 26, 1991 to H. A. Bing discloses an automobile utility bag which includes a strap for fastening around a seat or a seat back. A pocket is provided having an overlying flap so that items can be accumulated within the saddle bag. U.S. Pat. No. 3,756,481, issued on Sep. 4, 1973, to R. W. Schaefer provides a carrying case usable for police officers. The carrying case has a plurality of dividers within a rigid box. A frame extends from the box so as to fit over the back of an automobile seat. The box is compartmentalized so that objects and papers can be received therein. U.S. Pat. No. 4,832,241, issued on May 23, 1989, to D. E. Radcliffe describes a vehicle organizer which is designed to be mountably fastened to the passenger seat of a vehicle. An extended vertical container provides a plurality of dividers which allow forms to be easily stowed and retrieved. U.S. Pat. No. 4,949,890, issued on Aug. 21, 1990, to V. K. Schultz discloses a filing, organizing and desk device for placement upon the passenger seat of a vehicle. This invention provides a multiple-shelved filer unit having side walls and a rear wall. A plurality of compartments are arranged in vertical fashion extending from a flat top surface desk top.

A problem with these prior art patents has been the difficulty of easily accessing the various documents that can be retained therein. It is important to be able to adjustably remove and/or add dividers as needed so as to form the filing system. The device should be configured so that papers and materials will remain in their proper position and can be easily viewed by the driver while in motion.

It is an object of the present invention to provide a vehicle organizing device which provides a plurality of compartments for the storage of documents.

It is another object of the present invention to provide an organizing device in which the compartments within the device are adaptable to receive a wide variety of different sizes, shapes, and volumes of materials.

It is another object of the present invention to provide a vehicle organizer which can be fastened to a large number of different types of automobile seats.

It is a further object of the present invention to provide a vehicle organizing system which is easy to use, simple to manufacture, relatively inexpensive, and simple to install.

These and other objects and advantages of the present invention will become apparent from a reading of the attached specification and appended claims.

SUMMARY OF THE INVENTION

The present invention is a filing and organizing device for use in automobiles and other vehicles. The filing device of the present invention comprises a front panel, a rear panel, a first flexible side wall extending between the front panel and the rear panel, a second flexible side wall extending between an opposite edge of the front and rear panels, a plurality of divider panels removably affixed to the first and second side walls, and an attachment belt for removably affixing the filing device to a car seat. The panels and the side walls define a central receiving area. The divider panels are positioned in generally parallel relationship to the front and rear panels. These dividers are positioned within the central receiving area. A flexible bottom surface extends horizontally between the front and rear panels and the side walls so as to enclose the bottom of the central receiving area. The front panel and the rear panel have different sizes. Each of the divider panels are larger than the front panel and are smaller than the rear panel. Each of the dividers is of a different size. The larger divider is positioned closer to the rear panel than is the smaller divider. Each of the dividers has an equal length extending between side walls.

The first flexible side wall has a first plurality of vertical tracks extending along an inner surface of the side wall. The second side wall has a second plurality of vertical tracks extending along an inner surface. The first plurality of tracks is aligned with the second plurality of tracks. Each of the dividers has a first slot extending along one edge and a second slot extending along an opposite edge. The first and second slots slidably engage the first plurality and the second plurality of tracks, respectively.

The present invention also includes a first flexible strap having one end attached to the rear panel and extending across the first flexible side wall. A second flexible strap has one end attached to the rear panel and extends across the second side wall. The first strap adjustably engages the second strap so as to fix a distance between the front panel and the rear panel.

The attachment belt, in particular, comprises a first belt adjustably connected to a back surface of the rear panel and a second belt adjustably connected to a back surface of the rear panel. The first belt has a connector on the end opposite the rear panel. The second belt has a receiving section on an end opposite the rear panel. The connector of the first belt is engagable with the receiver of the second belt. The first and second belts have a combined length suitable for extending around the seat of a vehicle. The attachment belt system also includes a first L-shaped channel formed on a corner of the back surface so as to slidably receive an end of the first belt. A second L-shaped channel is formed on another corner of the back surface so as to slidably receive a second belt. The movement of the belts through these channels allows the belts to adjustably engage either bench seats or bucket seats of automobiles.

DETAILED DESCRIPTION OF THE INVENTION

Figure 1:
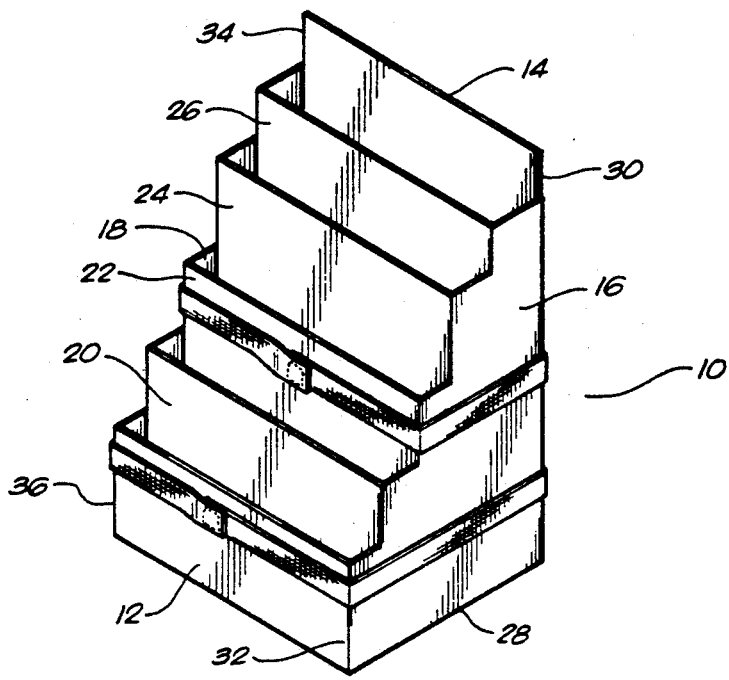
FIG. 1 is a perspective view showing the filing device in accordance with the present invention.

Referring to FIG. 1, there is shown at 10 the filing device in accordance with the preferred embodiment of the present invention Filing device 10 includes a front panel 12, a rear panel 14, a first flexible side wall 16, a second flexible side wall 18, and a plurality of divider panels 20, 22, 24, and 26. The first flexible side wall 16 extends from the front panel 12 to the rear panel 14. The second flexible side wall 18 extends from another edge of the front panel 12 to another edge of the rear panel 14. The divider panels 20, 22, 24, and 26 are removably affixed between the first side wall 16 and the second side wall 18. As can be seen, the divider panels 20, 22, 24, and 26 are positioned in generally parallel relationship to the front panel 12 and to the rear panel 14.

The front panel 12 is a flat rigid member that forms the forward portion of the filing device 10. It can be seen that the front panel 12 extends upwardly vertically from the bottom 28 of filing device 10. The rear panel 14 is also a flat rigid member that extends upwardly vertically from bottom 28. The combination of the front panel 12, the rear panel 14, and the side walls 16 and 18 form a central receiving area for any material which might be placed into the filing device 10. In the configuration of the present invention, the front panel 12 will have a much smaller height than does the rear panel 14.

The first flexible side wall 16 and the second flexible side wall 18 are made of, preferably, a vinyl material A soft flexible material is chosen because of its easy compressibility and because of its safety for use within an automobile. The first flexible side wall 16 is affixed to edge 30 of the rear panel 14 and extends outwardly therefrom. The bottom of the side wall 16 is adhered to the bottom 28 of the filing device 10. In general, the side walls 16 and 18 take on a sawtooth configuration. Each edge found on the side walls 16 and 18 is used to accommodate a divider. The first flexible side wall 16 is attached, at its other end, to an edge 32 of the front panel 12. The second flexible side wall 18 is attached to an edge 34 of the rear panel 30 and extends outwardly so as to join with another edge 36 of the front panel 12. The second flexible side wall 18 is arranged in parallel to the first flexible side wall 16 and takes on a configuration similar to that of side wall 16. The second flexible side wall 18 is also adhered to the bottom 28 of filing device 10.

The dividers 20, 22, 24, and 26 are also flat rigid members that extend upwardly from the bottom 24 in generally parallel relationship to the front panel 12 and the rear panel 14. The first divider 20 is positioned a small distance from the front panel 12. The divider 20 has a height that is greater than the height of the front panel 12. The divider 22 is positioned between divider 20 and divider 24. Divider 22 has a height which is greater than the height of divider 20. Divider 24 is positioned closer to the rear panel 14 than divider 22. Divider 24 has a greater height than that of adjacent divider 22. Finally, divider 26 is spaced a small distance from the rear panel 14. The divider 26 has a height which is greater than the divider 24 but shorter than the height of the rear panel 14. This tiered configuration of dividers enables easier access to each of the compartments formed by the dividers and allows for greater flexibility in use. Each of the dividers are placed in generally parallel relationship to each other. On the interior, the dividers 20, 22, 24, and 26 loosely abut the bottom surface 28. Each of the dividers is slidably received by tracks formed on the inner surfaces of the side walls 16 and 18.

Figure 2:
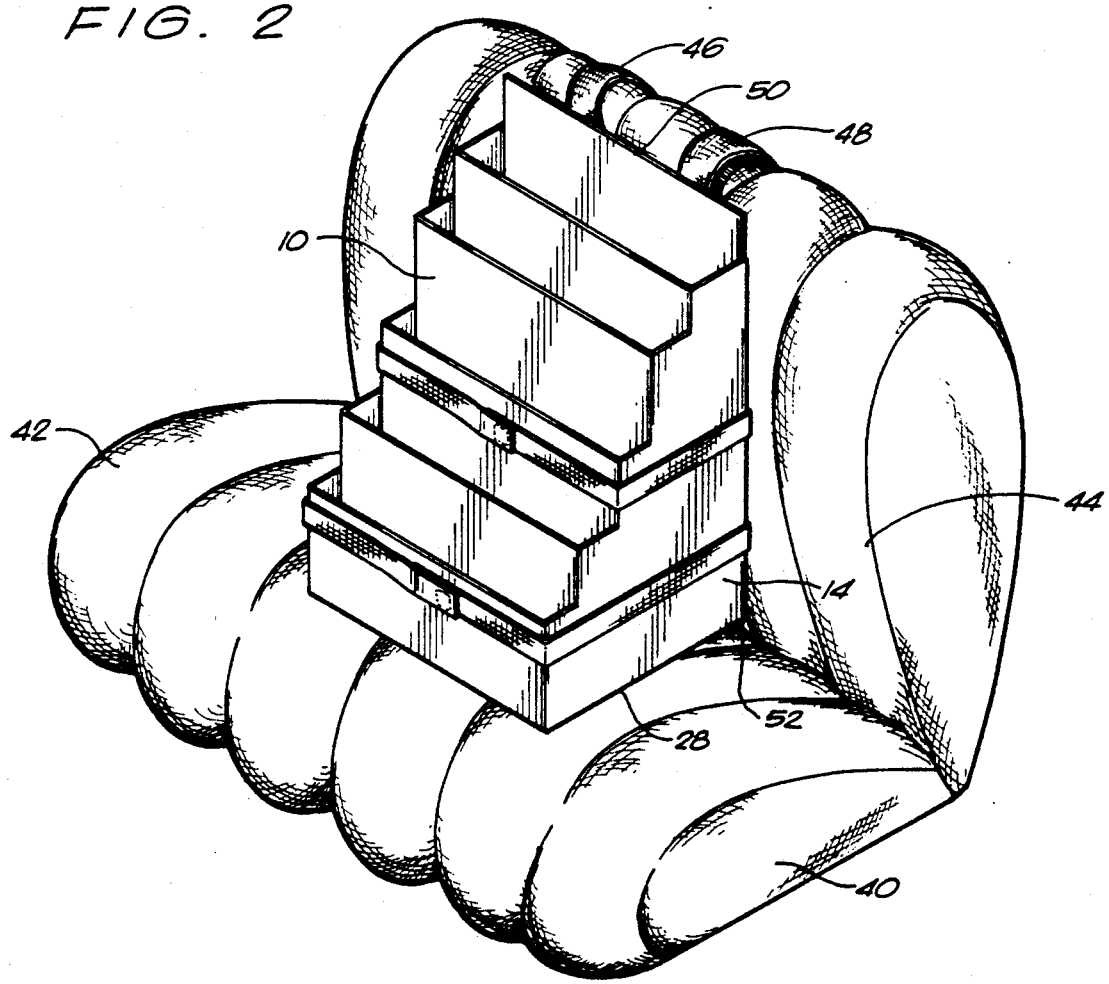
FIG. 2 is a perspective view showing the filing device of the present invention as affixed to the seat of an automobile.
Figure 5:
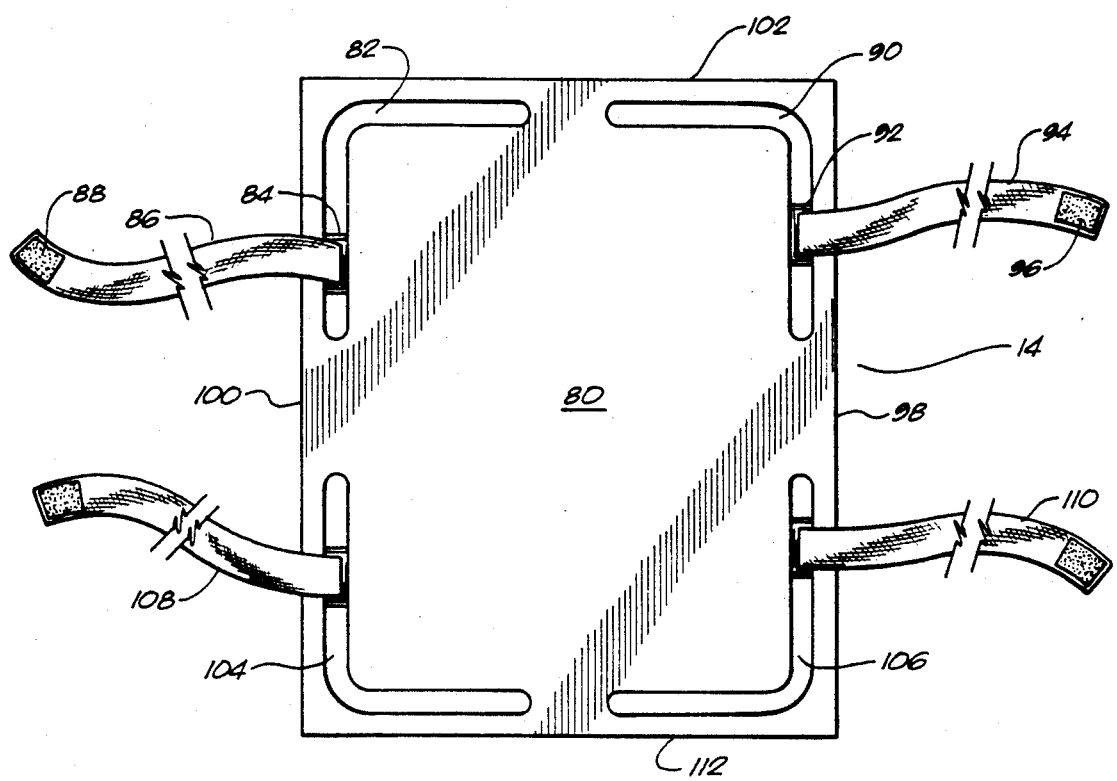
FIG. 5 is a rearward view of the filing device of the present invention.

FIG. 2 illustrates the filing device 10 as positioned on an automobile seat 40. In normal use, the filing device 10 is positioned on the seat surface 42 of an automobile seat, or a seat for other vehicles. The bottom 28 of the filing device 10 rests in abutment with this seat surface 42. As such, the seat surface 42 acts as a support for the filing device 10. The back surface of the rear panel 14 is placed in surface-to-surface contact with the seatback 44. As such, the seatback 44 provides vertical support for the filing device 10. The rear panel 14 is held in position by the use of belts 46 and 48. It can be seen that the belts 46 and 48 extend outwardly from the upper edge 50 of the rear panel 14. These belts will wrap around the seatback 44 and fasten to the rear panel 14 at the bottom corner 52. The belt is configured so as to have a sufficient length so as to wrap around the seatback 44. When the filing device 10 is in the position illustrated in FIG. 2, it is within easy access for easy use by a driver of a vehicle sitting adjacent to the filing device 10. The rear configuration of filing device 10, along with the arrangement of belts 46 and 48, is shown in FIG. 5.

Figure 3:
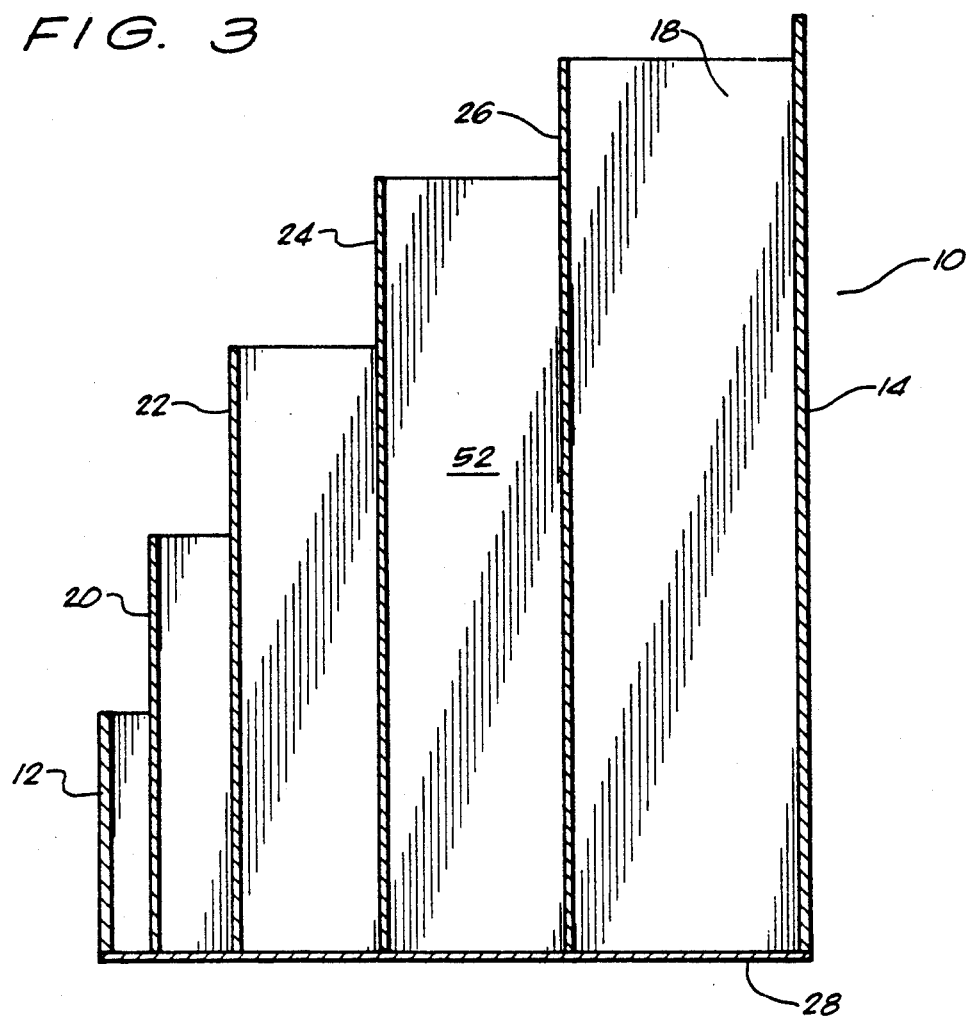
FIG. 3 is a cross-sectional view of the filing device of the present invention.

FIG. 3 is a cross-sectional view showing the interior arrangement of the filing device 10. It can be seen that the front panel 12 and the rear panel 14 are arranged in generally parallel relationship. The dividers 20, 22, 24, and 26 are arranged in a "tiered" configuration between the front panel 12 and the rear panel 14. Bottom surface 28 is fastened at one end to the front panel 12 and is fastened at the other end to the rear panel 14. As such, the central receiving area 52 is defined. It can further be seen that the side wall 18 provides an enclosure surface for the filing device 10. The arrangement of the panels illustrated in FIG. 3 allows for the easy introduction and removal of papers, and other materials, from each of the compartments defined by the dividers 20, 22, 24, and 26. It is important to realize that the present invention provides a flexible device which is adaptable to a wide variety of configurations. As such, in normal use, any of the dividers 20, 22, 24 and 26, can be removed as needed. For example, if it is desired to have a larger area towards the front panel 12, then the first divider 20 can be slidably removed from the arrangement shown in FIG. 3. The receiving area defined by the area between the front panel 12 and the divider 22 will be much larger. Similarly, divider 26 can be removed to provide a larger receiving area adjacent to the rear panel 14. In FIG. 3, the belted arrangement for attachment of the filing device 10 to an automobile seat has been deleted.

Figure 4:
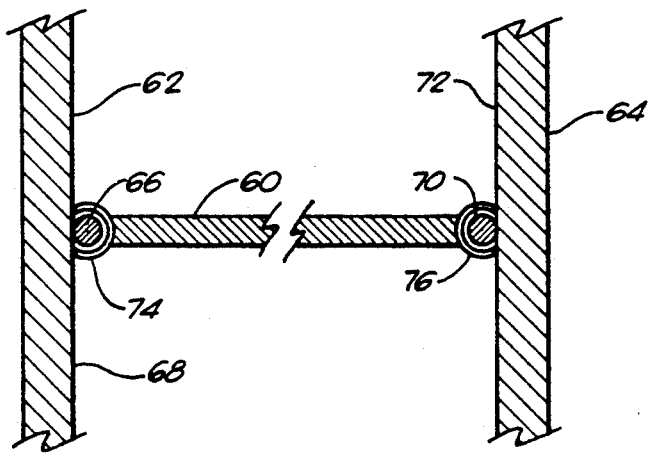
FIG. 4 is an isolated view showing the configuration of the divider panels as installed within the flexible side walls of the present invention.

FIG. 4 illustrates the unique tracking system of the present invention in which the dividers are maintained in a properly vertical position. In FIG. 4, it can be seen that divider 60 extends between side wall 62 and side wall 64. The side wall 62 has a vertical track 66 fastened to the inner surface 68 of the flexible side wall 62. In the preferred embodiment of the present invention, the tracking member 66 is a rigid rod that is attached by adhesives, sewing, taping, or other means, to the inner surface 68. A plurality of these vertical tracking members 66 are fastened along the inner surface 68 corresponding to the locations of the various dividers which are to be used in the filing device 10 of the present invention.

Similarly, the second side wall 64 includes a rigid vertical tracking member 70 which is fastened to the inner surface 72. The tracking members 66 and 70 provide a surface upon which the divider 60 can be slidably received. Also, the use of the rigid rods 66 and 70 provide structural support to the flexible side walls 62 and 64. As such, the side walls 62 and 64 will be supported in a proper manner and will not tend to sag or distort.

Divider 60 has a first slot 64 extending along a vertical edge of the divider 60. A second slot 76 is attached along another edge of the divider 60. The slots 74 and 76 are configured so as to slidably engage the outer periphery of the vertical tracking members 66 and 70. In the embodiment illustrated in FIG. 4, the slots 74 and 76 are somewhat semi-cylindrical members which are fastened to the divider 60. However, the shape of the slots 74 and 76 is not intended as a limitation on the present invention. Various other techniques for engaging the tracking members 66 and 70 can be configured within the scope of the present invention.

When it is necessary to install the divider 60 into the filing device 10 the slots 74 and 76 are brought into alignment with the tracking members 66 and 70 such that the interior divider 60 can slide downwardly along the tracking members. The bottom end of the divider 60 will rest in loose abutment with the flexible bottom 28 of the filing device. The use of the divider 60 adds further structural support and integrity to the overall configuration of the filing device 10. When the divider 60 is removed, the filing device 10 will continue to have sufficient structural integrity so as to support items therein.

FIG. 5 illustrates the back surface 80 of the rear panel 14. In particular, FIG. 5 shows the belted arrangement for enabling the filing device 10 to be appropriately fastened to a vehicle seat. It can be seen that a first L-shaped channel 82 is formed along a corner of the back surface 80. A slide member 84 is inserted into the channel 82. The slide member 84 has a suitable configuration so as to allow it to slide throughout the length of channel 82. Belt 86 is fastened, at one end, to slide member 84. A connector 88 is provided at the other end of belt 86. A second channel 90 is provided on another corner of the back surface 80 of rear panel 14. The second L-shaped channel 90 similarly includes a slide member 92, a belt 94, and a receiving section 96 on belt 94. In the configuration illustrated in FIG. 3, the belts 86 and 94 are free to move from a position in which they extend outwardly from sides 98 and 100 of back surface 80 to a position in which they extend outwardly from side 102 of back surface 80. The connector 88 of belt 86 and the receiver 96 of belt 94 can appropriately join together by buckling, belting, or by VELCRO (TM) attachments. In the position illustrated in FIG. 5, the belts 86 and 94 are in a proper position to extend around bucket seats and/or individual seats within a vehicle. When the belts 86 and 94 extend outwardly from the top side 102, they are in the position to fasten to the bench seats of automobiles.

FIG. 5 also shows the use of a third channel 104 and a fourth channel 106 to which belts 108 and 110 are fastened in the same manner as belts 86 and 94. Belts 108 and 110 provide additional attachment capabilities. When the belts 108 and 110 extend outwardly along bottom side 112 of panel 14 they are in an appropriate position to join with the belts 86 and 94 extending outwardly from the top side 102. In this position, the filing device 10 can be appropriately joined to a bench seat of an automobile.

Figure 6:
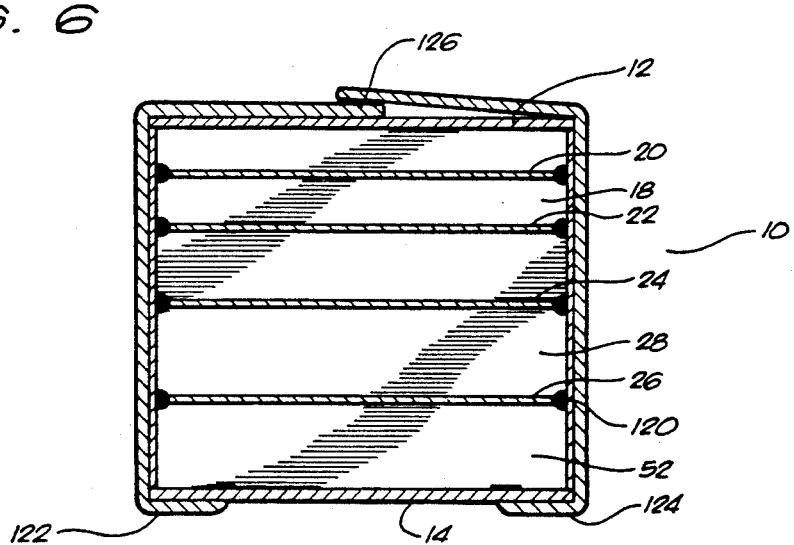
FIG. 6 is a top view of the filing device of the present invention.

FIG. 6 illustrates, generally, the top view of the filing device 10. It can be seen that the dividers 20, 22, 24, and 26 extend between the flexible side walls 16 and 18. A plurality of vertical tracks 120 are shown as fastened to the side walls 16 and 18. The bottom surface 28 is also illustrated. The arrangement of the front panel 12 and the back panel 14, in combination with the side walls 16 and 18, forms the central receiving area 52 of the filing device 10. Each of the dividers can be appropriately removed so as to expand or contract the individual filing compartments within the central receiving area 52.

Importantly, and with reference to FIG. 1, it can be seen that a first flexible strap 122 is fastened to the rear panel 14 and extends across the first side wall 16 to the front panel 12. A second flexible strap 124 is also joined to the rear panel 14 and extends along the second flexible side wall 18 to the front panel 12. The flexible straps 122 and 124 are appropriately joined at 126 along the front panel 12. This strap arrangement can be seen in FIG. 1 as extending along the front panel 12 It can also be seen as extending across the divider 22. The purpose of these flexible straps is to allow the user to fix a suitable distance between the front panel 12 and the rear panel 14. If it is necessary to contract the size of the central receiving area 52, then the flexible straps 122 and 124 can be appropriately tightened so as to compress the arrangement. The straps 122 and 124 also add additional structural integrity to the overall configuration of the filing device 10.

The present invention offers an excellent filing device for those that must carry out business activities within their vehicle. Various filing compartments are provided within the filing device so that a proper organization of materials can be accomplished. Papers, books, ledgers, notebooks, and other materials can be contained, as needed, within the filing device. The "tiered" arrangement of the dividers enhances the ability to distinguish the appropriate filing compartment and also enhances the accessibility of each compartment. The filing device of the present invention provides a great deal of flexibility to the user by providing an ability to remove each of the dividers from the device. The dividers can be easily removed or installed as needed without undue manipulation of the device. The device is both flexible and sufficiently sturdy to withstand continued use.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A filing and organizing device for use in vehicles comprising:
   a front panel;
   a rear panel;
   a first flexible side wall extending from said front panel to said rear panel;
   a second flexible side wall extending from said front panel to said rear panel, said panels and said side walls defining a central receiving area;
   a plurality of dividers removably affixed to said first and second side walls, said divider panels positioned in generally parallel relationship to said front and rear panels, and plurality of dividers positioned within said central receiving area, said first flexible side wall having a first plurality of tracks extending vertically parallel along an inner surface of said first flexible side wall, said second flexible side wall having a second plurality of tracks extending vertically parallel along an inner surface of said second flexible side wall, said first plurality of tracks aligned in parallel relationship with said second plurality of tracks, each of said dividers having a first slot extending vertically along one edge and a second slot extending vertically along an opposite edge, said first slot slidably engaging one of said first plurality of tracks, said second slot slidably engaging one of said second plurality of tracks; and
   attachment means connected to said rear panel for removably attaching to a seat.

2. The device of claim 1, further comprising:
   a flexible bottom surface extending horizontally between said front and rear panels and said first and second side walls, said flexible bottom surface in loose abutment with said divider panels.

3. The device of claim 1, said front panel and said rear panel having different sizes, said divider panels being larger than said front panel and smaller than said rear panel.

4. The device of claim 3, each of said plurality of dividers having a different size, a larger divider positioned closer to said rear panel than a smaller divider.

5. The device of claim 4, each of said plurality of dividers having an equal length extending between said first and second flexible side walls.

6. The device of claim 1, further comprising:
   a first flexible strap having one end attached to said rear panel, said first flexible strap extending across said first flexible side wall; and
   a second flexible strap having one end attached to said rear panel, said second flexible strap extending across said second flexible side wall, said first flexible strap adjustably engagable with said second flexible strap so as to fix a distance of said front panel from said rear panel.

7. The device of claim 1, said attachment means comprising:
   a first belt adjustably connected to a back surface of said rear panel; and
   a second belt adjustably connected to said back surface of said rear panel, said first belt having a connector on an end opposite said rear panel, said second belt having a receiver on an end opposite said rear panel, said connector of said first belt engagable with said receiver of said second belt.

8. The device of claim 7, said first and second belts having a combined length suitable for extending around a seat of a vehicle.

9. The device of claim 7, said attachment means further comprising:
   a first L-shaped channel formed on a corner of said back surface of said rear panel, said first channel slidably receiving an end of said first belt; and
   a second L-shaped channel formed on another corner of said back surface of said rear panel, said second channel slidably receiving an end of said second belt.

10. A filing and organizing device for use in vehicles comprising:
    a front panel;
    a rear panel having a vertical height greater than a height of said front panel;
    a first flexible side wall extending from an edge of said front panel to an edge of said rear panel, said first flexible side wall having a first vertical track formed along an inner surface of said first flexible side wall;
    a second flexible side wall extending from another edge of said front panel to another edge of said rear panel, said second flexible side wall having a second vertical track formed along an inner surface of said second flexible side wall, said first vertical track aligned with said second vertical track;
    a removable divider slidably received by said first and second vertical tracks, said divider extending between said first and second side walls, said divider in generally parallel relationship with said rear panel;
    a first flexible strap having one end attached to said rear panel, said first flexible strap extending across said first flexible side wall; and
    a second flexible strap having one end attached to said rear panel, said second flexible strap extending across said second flexible side wall, said first flexible strap adjustably engagable with said second flexible strap so as to fix a distance of said front panel from said rear panel.

11. The device of claim 10, said removable divider having a first slot formed along one vertical edge and a second slot formed along an opposite vertical edge, said first slot engaging said first track, said second slot engaging said second track.

12. The device of claim 10, said divider having a height greater than said front panel and less than said rear panel.

13. The device of claim 10, said front panel, said rear panel, and said divider being flat rigid members arranged in generally parallel relationship.

14. The device of claim 10, further comprising:
an attachment belt means adjustably affixed to a back surface of said rear panel, said attachment belt having a length suitable for affixing said rear panel to a seat back.

15. The device of claim 14, said attachment belt means comprising:
a first belt adjustably connected to a back surface of said rear panel; and
a second belt adjustably connected to said back surface of said rear panel, said first belt having a connector on an end opposite said rear panel, said second belt having a receiver on an end opposite said rear panel, said connector of said first belt engagable with said receiver of said second belt.

16. The device of claim 15, said attachment belt means comprising:
a first L-shaped channel formed on a corner of said back surface, said first channel slidably receiving an end of said first belt; and
a second L-shaped channel formed on another corner of said back surface, said second channel slidably receiving an end of said second belt.

* * * * *